(12) United States Patent
Yang et al.

(10) Patent No.: US 10,750,520 B2
(45) Date of Patent: Aug. 18, 2020

(54) RADIO LINK CONTROL/PACKET DATA CONVERGENCE PROTOCOL WINDOW ADVANCE WITH HOLES

(71) Applicant: QUALCOMM Incorporated, San Diego, CA (US)

(72) Inventors: Yue Yang, San Diego, CA (US); Aziz Gholmieh, Del Mar, CA (US); Shailesh Maheshwari, San Diego, CA (US); Srinivasan Balasubramanian, San Diego, CA (US); Vishal Dalmiya, San Diego, CA (US); Bao Vinh Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/913,380

(22) Filed: Mar. 6, 2018

(65) Prior Publication Data
US 2018/0317236 A1    Nov. 1, 2018

Related U.S. Application Data

(60) Provisional application No. 62/490,879, filed on Apr. 27, 2017.

(51) Int. Cl.
*H04W 72/10* (2009.01)
*H04L 12/841* (2013.01)
(Continued)

(52) U.S. Cl.
CPC ............ *H04W 72/10* (2013.01); *H04L 47/28* (2013.01); *H04L 47/34* (2013.01); *H04W 28/12* (2013.01);
(Continued)

(58) Field of Classification Search
CPC ..... H04L 69/324; H04L 47/225; H04L 1/188; H04L 47/28; H04L 47/34; H04L 47/41;
(Continued)

(56) References Cited

U.S. PATENT DOCUMENTS 6,330,435 B1 * 12/2001 Lazraq ................. H04L 1/1809
370/229
2003/0009717 A1 * 1/2003 Fukushima .......... H04L 1/1887
714/748
(Continued)

FOREIGN PATENT DOCUMENTS

EP          1333609 A1    8/2003
EP          2538618 A1    12/2012
WO       2017023444 A1    2/2017

OTHER PUBLICATIONS

Partial International Search Report—PCT/US2018/021349—ISA/EPO—dated Jun. 11, 2018.
(Continued)

*Primary Examiner* — Jung Liu
(74) *Attorney, Agent, or Firm* — Patterson + Sheridan, L.L.P.

(57) ABSTRACT

Techniques and apparatus for implementing a radio link control (RLC) layer and/or packet data convergence protocol (PDCP) layer window advance with holes (e.g., one or more missing packets) are provided. One technique includes generating a sequence of packets for transmission to an apparatus. A determination of whether to request the apparatus to at least temporarily ignore missing packets from the sequence is made based on one or more criteria. A message with an indication of the determination is transmitted to the apparatus. The apparatus may receive the sequence of packets, detect missing packets in the sequence, and process the sequence of packets in accordance with the indication in the received message.

22 Claims, 9 Drawing Sheets

(51) Int. Cl.
*H04L 12/801* (2013.01)
*H04W 28/12* (2009.01)
*H04L 29/08* (2006.01)
*H04L 12/851* (2013.01)
*H04L 12/891* (2013.01)
*H04W 4/70* (2018.01)

(52) U.S. Cl.
CPC .............. *H04L 47/24* (2013.01); *H04L 47/41* (2013.01); *H04L 69/324* (2013.01); *H04W 4/70* (2018.02)

(58) Field of Classification Search
CPC ..... H04L 47/24; H04L 1/1685; H04L 1/1809; H04L 1/1832; H04L 1/187; H04L 1/1877; H04W 28/06; H04W 28/04; H04W 72/10; H04W 28/12; H04W 80/02; H04W 74/04; H04W 28/065
See application file for complete search history.

(56) References Cited

U.S. PATENT DOCUMENTS

| | | | |
|---|---|---|---|
| 2005/0175012 A1 | 8/2005 | Gupta et al. | |
| 2006/0098574 A1* | 5/2006 | Yi | H04L 1/1877 370/236 |
| 2007/0268861 A1* | 11/2007 | Diachina | H04L 1/1838 370/329 |
| 2008/0080516 A1* | 4/2008 | Sammour | H04L 1/165 370/394 |
| 2015/0135024 A1* | 5/2015 | Caverni | H04L 1/1874 714/704 |
| 2015/0305012 A1* | 10/2015 | Yl | H04L 67/1078 370/329 |
| 2016/0057778 A1* | 2/2016 | Lee | H04L 1/1685 370/329 |

OTHER PUBLICATIONS

Qualcomm Incorporated: "Moving Reordering Window at NR PDCP", 3GPP Draft; R2-1706801, 3rd Generation Partnership Project (3GPP), Mobile Competence Centre; 650, Route Des Lucioles; F-06921, Sophia-Antipolis Cedex; France, vol. RAN WG2, Qingdao, China; Jun. 27, 2017-Jun. 29, 2017, Jun. 26, 2017 (Jun. 26, 2017), XP051301298, 1 page, Retrieved from the Internet: URL: http://www.3gpp.org/ftp/Meetings_3GPP_SYNC/RAN2/Docs/ [retrieved on Jun. 26, 2017].

Intel Corporation et al., "Transfer of ORB ID for LWA", 3GPP Draft; R2-156740-LWA-DRB-ID-V2, 3rd Generation Partnership Project (3GPP), Mobile Competence Centre; 650, Route Des Lucioles; F-06921 Sophia-Antipolis Cedex; France, vol. Ran WG2, No. Anaheim, US; Nov. 16-Nov. 20, 2015 Nov. 7, 2015, XP051024912, Retrieved from the Internet: URL:http://www.3gpp.org/ftp/tsg_ran/WG2_RL2/TSGR2_92/Docs/ [retrieved on Nov. 7, 2015].

International Search Report and Written Opinion—PCT/US2018/021349—ISA/EPO—dated Sep. 18, 2018.

Qualcomm Incorporated: "Moving Receiving/Reordering Window at Receiver in NR", 3GPP Draft; R2-1705621 Moving Receiving Reordering Window in NR, 3rd Generation Partnership Project (3GPP), Mobile Competence Centre; 650, Route Des Lucioles; F-06921 Sophia-Antipolis Cedex; France, vol. RAN WG2, No. Hangzhou, China; May 15-May 19, 2017 May 6, 2017, XP051265062, Retrieved from the Internet: URL:http://www.3gpp.org/ftp/tsg_ran/WG2_RL2/TSGR2_98/Docs/ [retrieved on May 6, 2017], 2 pages.

* cited by examiner

RADIO LINK CONTROL/PACKET DATA CONVERGENCE PROTOCOL WINDOW ADVANCE WITH HOLES

CROSS-REFERENCE TO RELATED APPLICATION

This application claims the benefit of and priority to U.S. Provisional Application Ser. No. 62/490,879, filed Apr. 27, 2017, which is assigned to the assignee hereof and hereby expressly incorporated by reference herein.

BACKGROUND

I. Field of the Disclosure

The present disclosure relates generally to communication systems, and more particularly, to methods and apparatus for implementing a radio link control (RLC) layer and/or packet data convergence protocol (PDCP) layer window advance with holes (e.g., one or more missing packets).

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first apparatus. The method generally includes generating a sequence of packets for transmission to a second apparatus. The method also includes determining, based on one or more criteria, whether to request the second apparatus to at least temporarily ignore missing packets from the sequence. The method further includes transmitting a message comprising an indication of the determination to the second apparatus.

Certain aspects provide a method for wireless communication by a first apparatus. The method generally includes detecting one or more packets that are missing from a sequence of packets received from a second apparatus. The method also includes receiving a request to at least temporarily ignore the missing packets when processing the sequence of packets. The method further includes processing the sequence of packets in accordance with the request.

Certain aspects of the present disclosure provide an apparatus for wireless communication. The apparatus generally includes means for generating a sequence of packets for transmission to a device. The apparatus also includes means for determining, based on one or more criteria, whether to request the device to at least temporarily ignore missing packets from the sequence. The apparatus further includes means for transmitting a message comprising an indication of the determination to the device.

Certain aspects of the present disclosure provide an apparatus for wireless communication. The apparatus generally includes means for detecting one or more packets that are missing from a sequence of packets received from a device. The apparatus also includes means for receiving a request to at least temporarily ignore the missing packets when processing the sequence of packets. The apparatus further includes means for processing the sequence of packets in accordance with the request.

Certain aspects of the present disclosure provide an apparatus for wireless communication. The apparatus includes at least one processor configured to generate a sequence of packets for transmission to a device, and determine, based on one or more criteria, whether to request the device to at least temporarily ignore missing packets from the sequence. The apparatus also includes a transmitter configured to transmit a message comprising an indication of the determination to the device. The apparatus further includes a memory coupled to the at least one processor.

Certain aspects of the present disclosure provide an apparatus for wireless communication. The apparatus includes at least one processor configured to detect one or more packets that are missing from a sequence of packets received from a device. The apparatus also includes a receiver configured to receive a request to at least temporarily ignore the missing packets when processing the sequence of packets. The at least one processor is also configured to process the sequence of packets in accordance with the request. The apparatus further includes a memory coupled to the at least one processor.

Certain aspects of the present disclosure provide a computer-readable medium having computer executable code stored thereon for wireless communication by an apparatus. The computer executable code generally includes code for generating a sequence of packets for transmission to a device. The computer executable code also includes code for determining, based on one or more criteria, whether to request the device to at least temporarily ignore missing packets from the sequence. The computer executable code further includes code for transmitting a message comprising an indication of the determination to the device.

Certain aspects of the present disclosure provide a computer-readable medium having computer executable code stored thereon for wireless communication by an apparatus. The computer executable code generally includes code for detecting one or more packets that are missing from a sequence of packets received from a device. The computer executable code also includes code for receiving a request to at least temporarily ignore the missing packets when processing the sequence of packets. The computer executable code further includes code for processing the sequence of packets in accordance with the request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
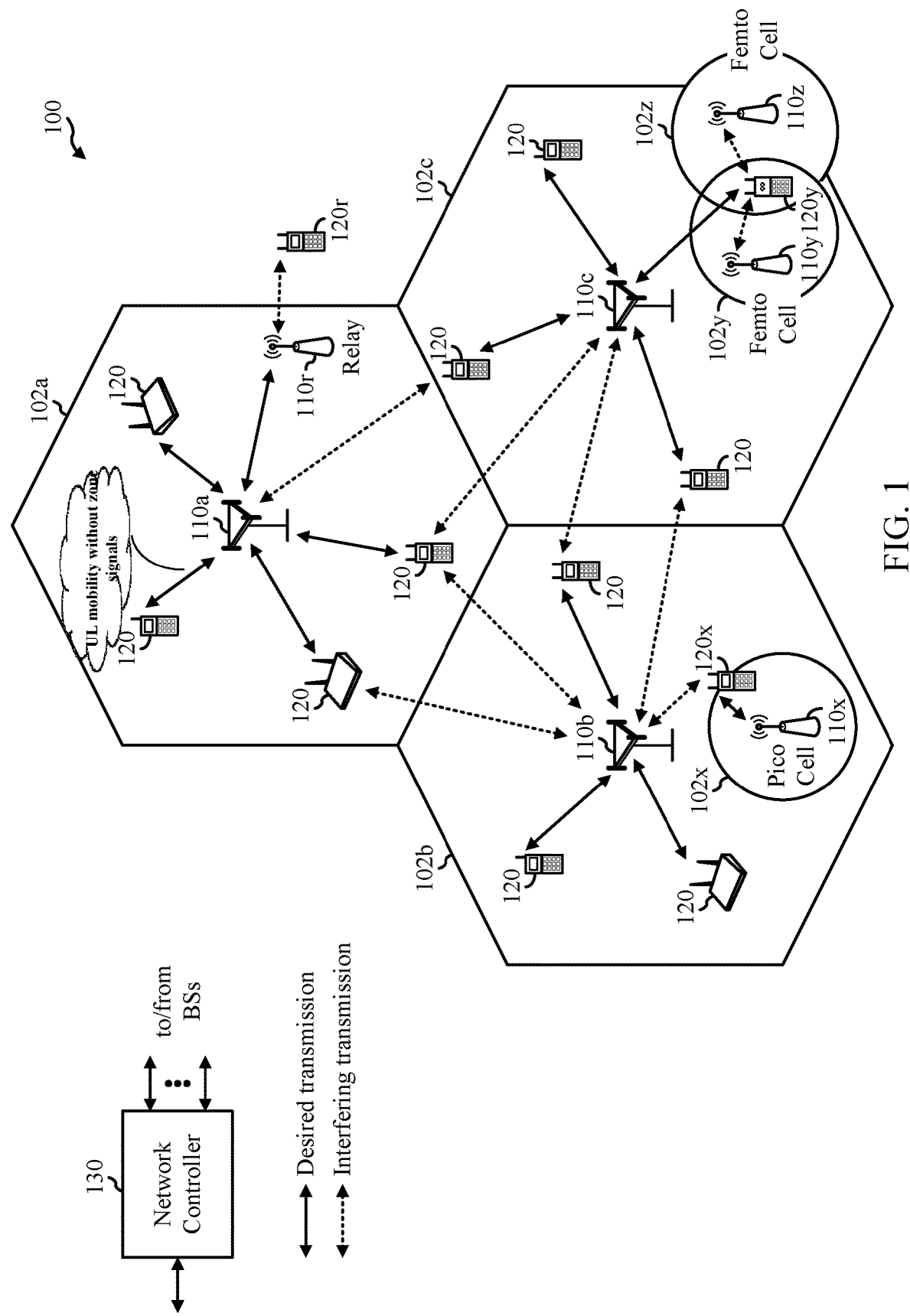
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

In conventional systems (e.g., LTE), devices typically use a "push based window" (e.g., at the radio link control (RLC) layer) to perform reordering and (requests for) retransmission of packets in order to guarantee the in-sequence delivery of packets to the upper layer without holes (e.g., missing packets). For example, implementing such a "push based window" may involve accumulating packets with sequence numbers (subsequent to the missing packets) until the hole is filled by retransmitted packets or until a reordering timer expires. Certain systems (e.g., 5G NR) may use a similar "push based window" scheme for requesting retransmission of packets. However, employing the conventional "push based window" scheme in 5G systems can delay the delivery of packets to upper layers of devices. Further, the conventional "push based window" scheme may not allow for a device to intentionally ignore holes when processing a sequence of packets.

Aspects presented herein provide techniques and apparatus for implementing a RLC/PDCP layer window advance in the presence of holes (e.g., one or more missing packets).

For example, a first apparatus using the techniques presented herein may generate a sequence of packets for transmission to a second apparatus. The first apparatus may determine, based on one or more criteria, whether to request the second apparatus to at least temporarily ignore missing packets from the sequence. The first apparatus may transmit to the second apparatus a message that includes an indication of the determination.

The second apparatus may detect missing packet(s) in a sequence of packets received from the first apparatus, and process the sequence of packets in accordance with the indication in the received message from the first apparatus. Doing so enables the second apparatus to advance a receiver window (used for reordering and/or retransmission) when processing a sequence of packets with missing packet(s) in order to reduce the delay in delivery of packets to upper layers of the second apparatus.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, devices (e.g., BS 110, UE 120, etc.) may use the techniques presented herein to implement a RLC/PDCP layer window advance when processing a sequence of packets with missing packet(s).

In one aspect, a first apparatus (e.g., BS 110, UE 120, etc.) may generate a sequence of packets for transmission to a second apparatus (e.g., another BS 110, UE 120, etc.). The first apparatus may determine, based on one or more criteria, whether to request the second apparatus to at least temporarily ignore missing packets from the sequence. The first apparatus may transmit a message comprising an indication of the determination to the second apparatus. The second apparatus may detect one or more packets that are missing from the sequence of packets received from the first apparatus, and may process the sequence of packets in accordance with the indication in the received message.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR (in one reference example) are described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
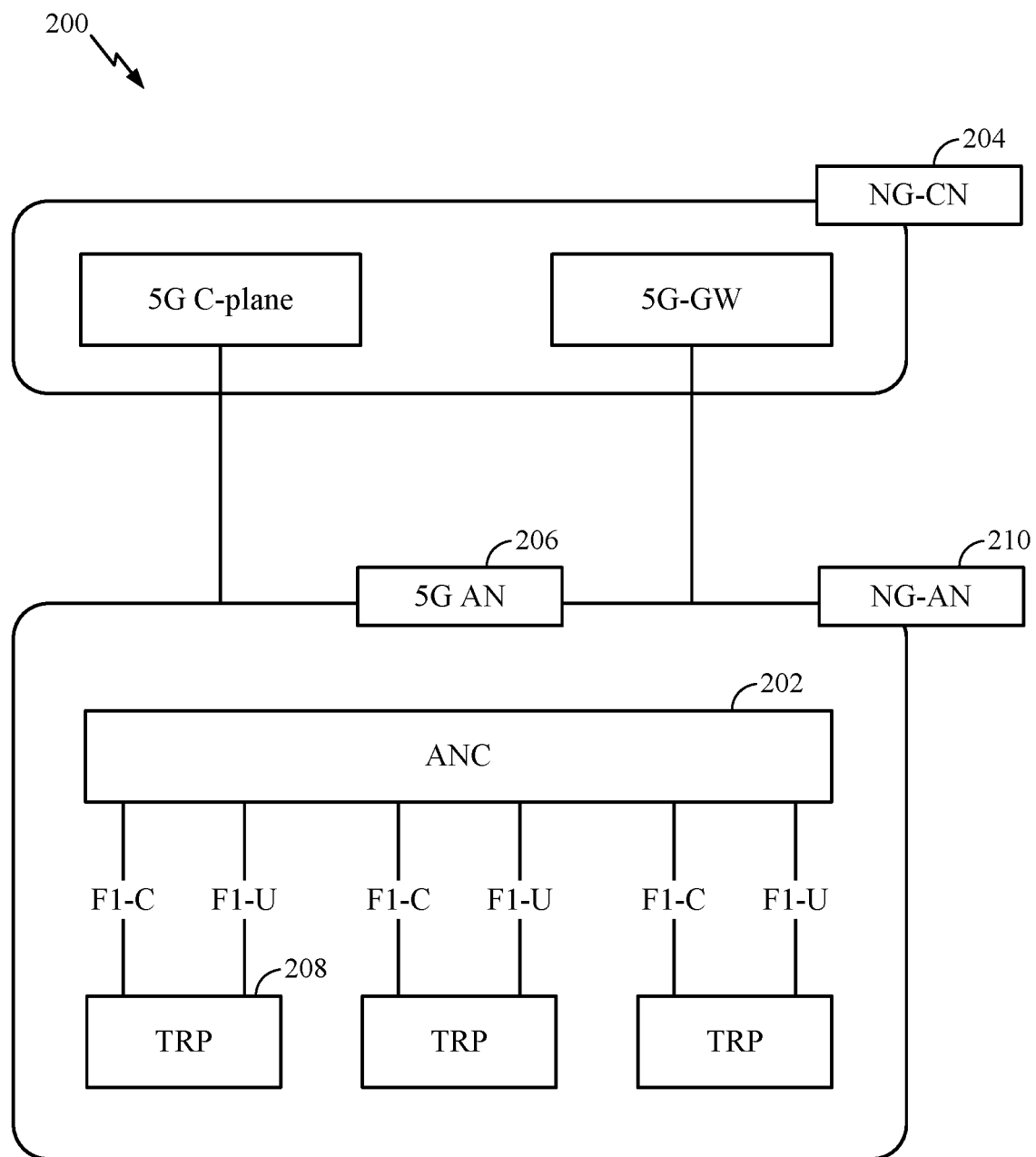
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
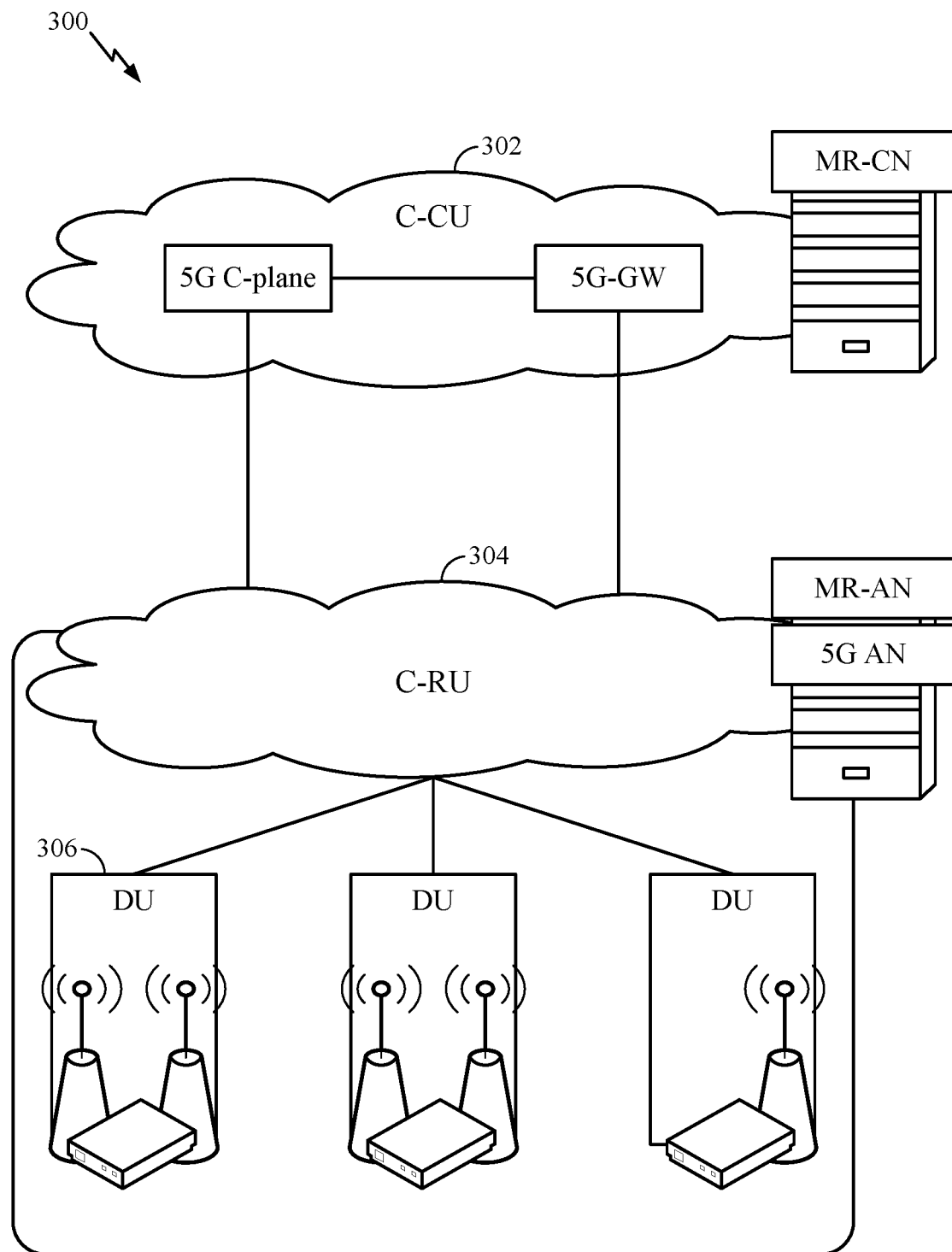
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
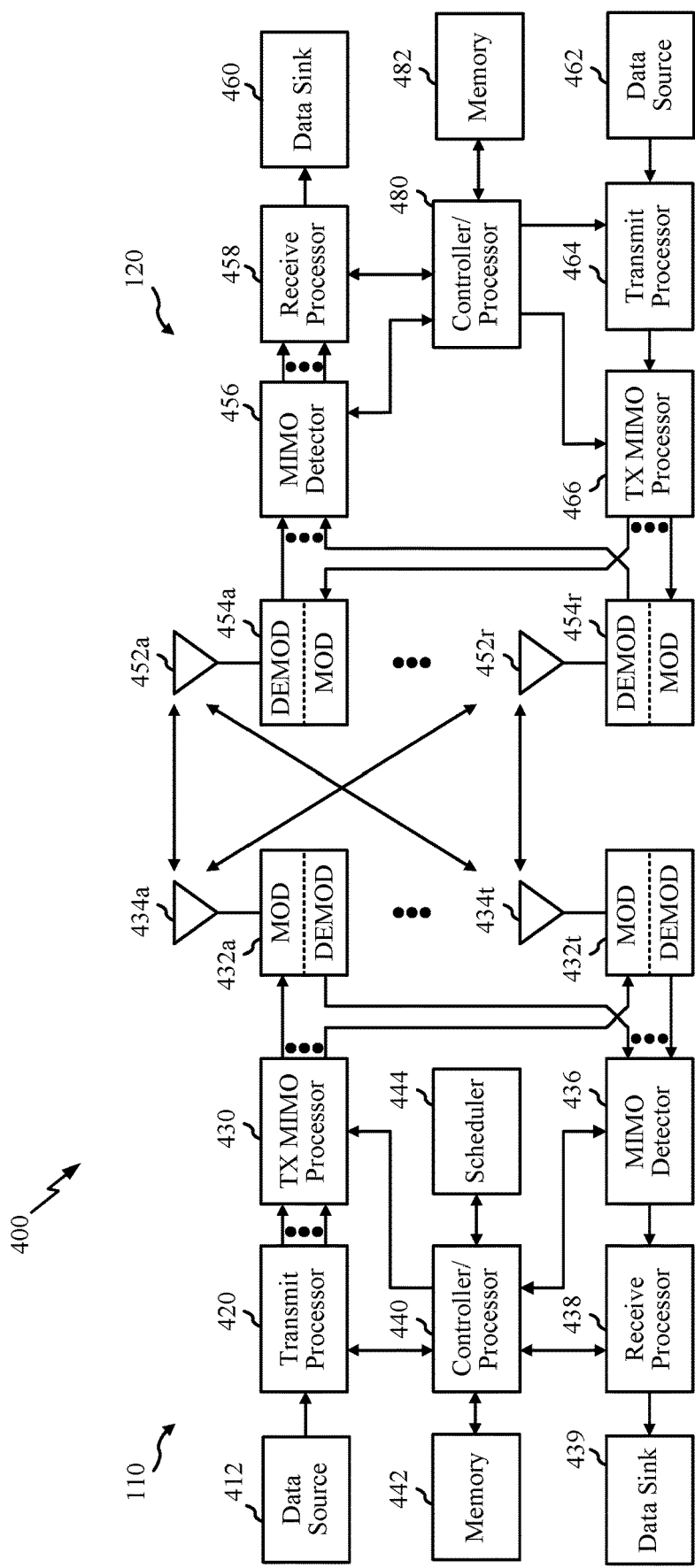
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 of the UE 120 and/or antennas 434, processors 430, 420, 438, and/or controller/processor 440 of the BS 110 may be used to perform the operations described herein and illustrated with reference to FIGS. 8-9.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a base station of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct operations 800 in FIG. 8 and/or operations 900 in FIG. 9 and/or processes for the techniques described herein (e.g., for implementing RLC/PDCP layer window advance with holes). The processor 480 and/or other processors and modules at the UE 120 may also perform or direct operations 800 in FIG. 8 and/or operations 900 in FIG. 9 and/or processes for the techniques described herein (e.g., for implementing RLC/PDCP layer window advance with holes). Enabling controller/processor 440 and/or other modules at the BS 110 and/or controller/processor 480 and/or other modules at the UE 120 to perform operations in FIGS. 8-9 (e.g., for implementing RLC/PDCP layer window advance with holes) can significantly reduce the delay associated with delivery of packets to upper layers of a receiving apparatus when using a "push-based window" to process a sequence of packets. The memories 442 and 482 may store data and program codes for the BS 110 and the UE 120, respectively. A scheduler 444 may schedule UEs for data transmission on the downlink and/or uplink.

Figure 5:
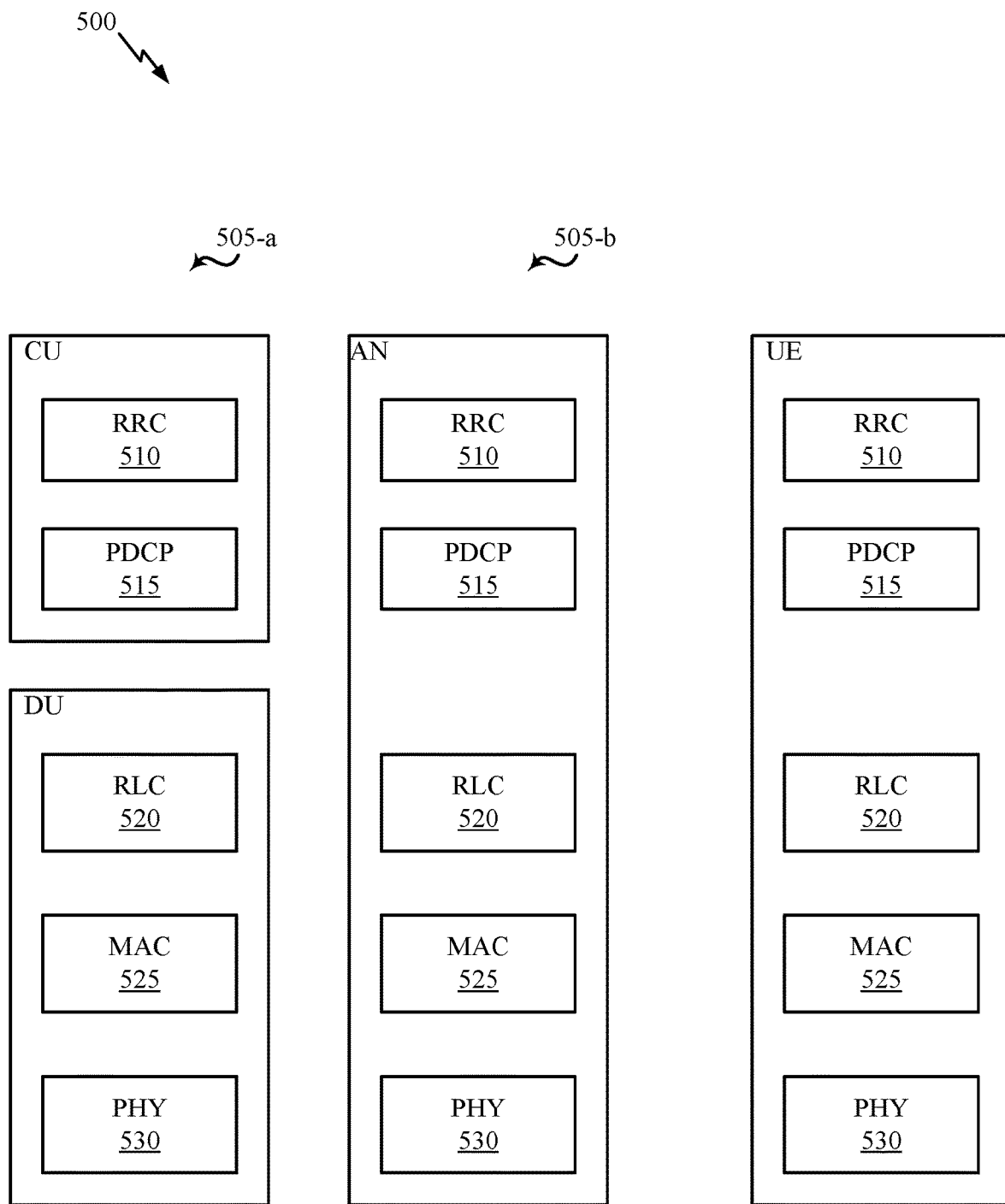
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
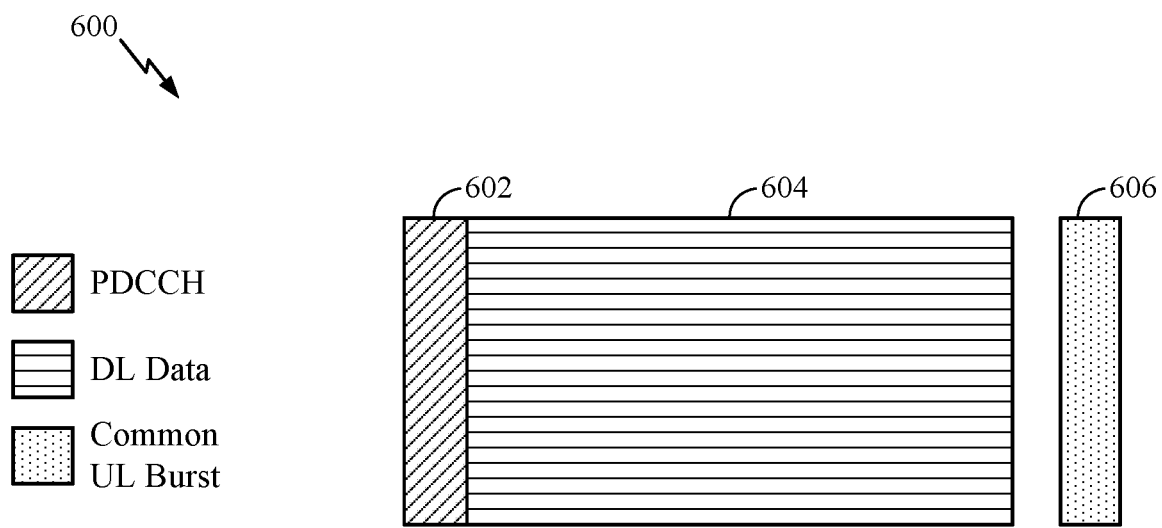
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
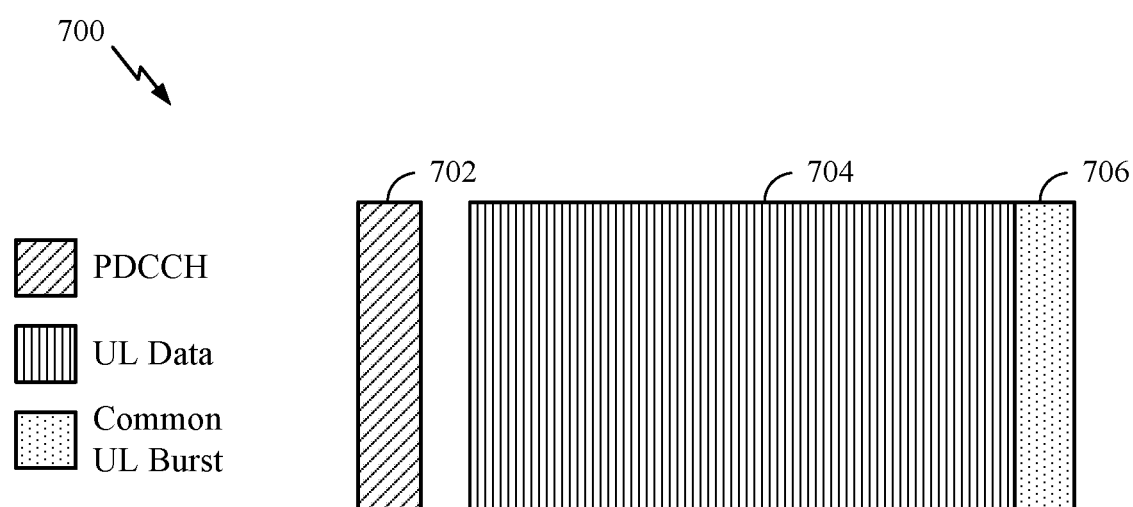
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In certain systems (e.g., LTE), devices may communicate using a RLC protocol. For example, a RLC entity in the device may be responsible for receiving/delivering RLC service data units (SDUs) from/to an upper layer (e.g., PDCP layer), and sending/receiving RLC protocol data units (PDUs) to/from its peer RLC entity (e.g., in another device) via lower layers (e.g., MAC layer, PHY layer, etc.). The RLC entity may operate in one or modes, including, e.g., a transparent mode (TM), unacknowledged mode (UM), and acknowledged mode (AM). An AM RLC entity generally includes a transmitting side and a receiving side. The transmitting side of an AM RLC entity may receive RLC SDUs from the upper layer and send RLC PDUs to its peer AM RLC entity via lower layers. The receiving side of an AM RLC entity may deliver RLC SDUs to the upper layer and receive RLC PDUs from its peer AM RLC entity via lower layers.

Example RLC/PDCP Window Advance with Holes

In some cases, an apparatus (e.g., UE) may receive data from another device with holes (e.g., missing packets) in the sequence. In such cases, the apparatus may attempt to request retransmission of the holes and/or attempt to re-order the packets before delivering the packets to an upper layer of the apparatus. In current systems (e.g., LTE), the LTE RLC AM generally employs a "push-based window" to perform reordering and (requests for) retransmission. The LTE RLC AM entity may do so in order to provide in-sequence delivery of packets to the upper layer without holes. For example, whenever the RLC AM entity of the receiving apparatus detects a hole (e.g., missing packets in a sequence), the RLC AM entity may accumulate (or store) each packet with a sequence number following the sequence numbers of the missing packets until either the hole is filled up by retransmission or a reordering timer expires. Thus, in a "push-based window" scheme, the delivery of the following packets may depend on whether previous holes have been filled up or the RLC AM entity has made numerous attempts to do so such that the re-ordering timer has expired.

In other systems (e.g., such as the 5G NR L2 architecture), the RLC AM entity may also use a "push-based window" scheme to perform retransmission (e.g., sending requests for retransmission to the peer RLC AM entity). The 5G RLC AM entity, however, may still be able to deliver out-of-order data to higher layers (e.g., PDCP). Additionally, the 5G PDCP entity may use a push-based window to perform re-ordering on the out-of-order data. For example, the 5G PDCP entity may accumulate out-of-order data until the hole is filled or a reordering timer expires.

In certain aspects, the "push-based window" can be used to provide the in-order delivery of packets to an upper layer. However, at the same time, the "push-based window" can delay the delivery of packets to the upper layer. Further, in some cases, there may be situations in which the transmitting apparatus wants the receiving device to intentionally ignore holes in a sequence and advance the receiver "push-based window" without attempting to process the holes in the sequence. Such situations may be based, in part, on whether the transmitting apparatus has high priority data that is available to be transmitted, whether the transmitting apparatus has been storing data for a long period of time (e.g., above a threshold period of time), etc. Accordingly, it may be desirable to provide techniques that enable an apparatus to intentionally ignore holes in a sequence of packets received from another apparatus when processing the sequence of packets.

Figure 8:
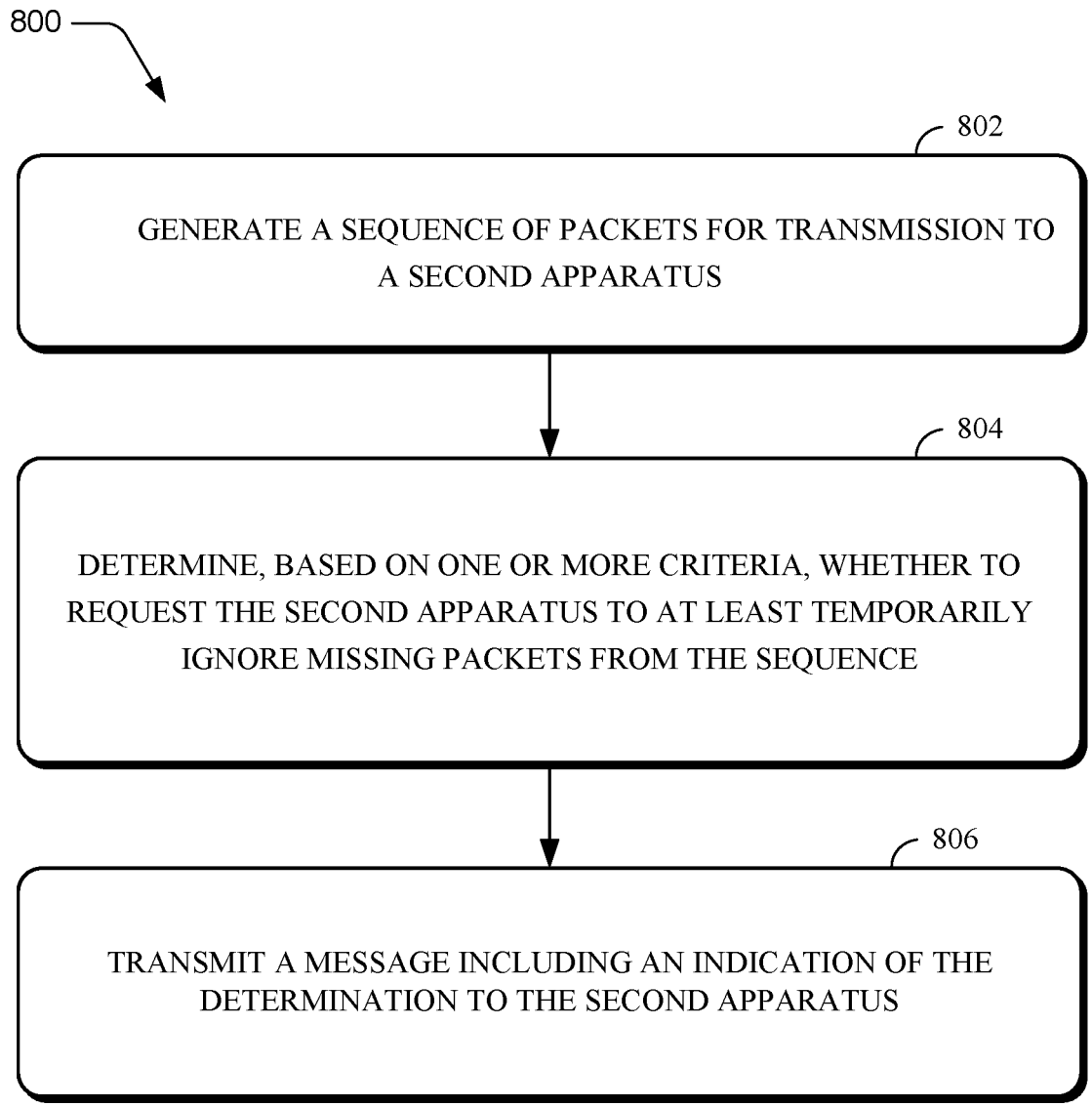
FIG. 8 illustrates example operations for wireless communications by an apparatus, in accordance with aspects of the present disclosure.

FIG. 8 illustrates example operations 800 for wireless communications, in accordance with certain aspects of the present disclosure. The operations 800 may be performed by a first apparatus (e.g., UE 120, BS 110, etc.).

The operations 800 may begin, at 802, where the first apparatus generates a sequence of packets for transmission to a second apparatus (e.g., UE 120, BS 110, etc.). At 804, the first apparatus determines, based on one or more criteria, whether to request the second apparatus to at least temporarily ignore missing packets from the sequence. In some aspects, the one or more criteria may include at least one of a priority of the missing packets, an amount of time that the sequence of packets have been stored (e.g., in a buffer) in the first apparatus, a capability of the first and/or second apparatus, etc. At 806, the first apparatus transmits (or signals) a message including an indication of the determination to the second apparatus.

In some aspects, the first apparatus may transmit the message with a first one or more packets of the sequence of the packets, and the first packets may be after the missing packets in the sequence (i.e., the first packets may have sequence numbers (SNs) that are after the SNs of the missing packets). The message may include an indication of the SNs for the missing packets. In some aspects, as described below, the message may include an indication of the determination for at least one of a RLC layer or PDCP layer of the second apparatus. In such cases, the message may include an indication of at least one of RLC SNs for the missing packets or PDCP SNs for the missing packets.

In aspects, the transmitting apparatus may generate and transmit a new dedicated message with an indication of whether the receiving apparatus should temporarily ignore the holes for at least one layer or permanently ignore the holes for multiple layers. In some aspects, the transmitting apparatus may transmit the dedicated message at the same time as the sequence of packets.

In one example, assume that the receiving apparatus receives packets with sequence numbers (SNs) 41-80. In this example, the receiving apparatus may detect that the holes (or missing packets) are packets with SNs 1-40. In one aspect, the transmitting apparatus can send a dedicated message to request the receiving apparatus to (intentionally) permanently ignore (e.g., refrain from processing) the packets with SNs 1-40 at both the RLC layer and PDCP layer of the receiving apparatus. Once the dedicated message is received, the receiving apparatus can advance the lower edge of the receiver "push-based window" from SN 1 to SN 41. The receiving apparatus may advance the lower edge of the receiver "push-based window" at both the RLC layer (e.g., to avoid processing RLC SDUs with SNs 1-40) and PDCP layer (e.g., to avoid processing PDCP PDUs with SNs 1-40). The RLC layer may ignore the packets with SNs 1-40 for retransmission. The PDCP layer may ignore the packets with SNs 1-40 for reordering/time management.

The receiving apparatus may then start processing packets from SN 41. For example, the receiving apparatus can begin delivering packets in order to the upper layer starting from SN 41 and permanently ignore packets with SNs 1-40. In one aspect, the receiving apparatus may discard packets with SNs 1-40 if they are subsequently received from the first apparatus.

In another example in which the receiving apparatus receives packets with sequence numbers (SNs) 41-80 (meaning packets with SNs 1-40 are the holes), assume the transmitting apparatus sends a dedicated message to request the receiving apparatus to (intentionally) temporarily ignore the packets with SNs 1-40 for a period of time, for example, when doing the reordering work for packets with SNs 41-80. In such a case, the receiving apparatus may still deliver the packets with SNs 41-80 in-order to an upper layer and then subsequently deliver the packets with SNs 1-40 to the upper layer once received from the first apparatus. In this example, the transmitting apparatus may request the receiving apparatus to temporarily ignore the missing packets at the RLC layer and/or PDCP layer. For example, the receiving apparatus may advance the receiver "push-based window" at the RLC layer in order to ignore the holes for retransmission and/or advance the receiver "push-based window" at the PDCP layer for reordering. Doing so may allow each layer to make an exception for in-order delivery and deliver packets out of order (e.g., such as for TCP ACKs).

In some aspects, the message transmitted to the receiving apparatus may include an indication of one or more communication links (e.g., one or more radio access technologies (RATs), such as 4G, 5G, WIFI, etc.) in which different portions of the sequence of packets were transmitted. For example, in some cases, the transmitting apparatus may send a summary about which packets were sent on which link, e.g., in the case where multiple links were used to send different packets of the sequence. Examples of multiple link transmission may include carrier aggregation and dual connectivity (e.g., LTE+LTE, NR+LTE, NR+NR, LTE+WIFI, NR+WIFI, etc.). By providing such a summary, the receiving apparatus can determine where to expect the next packet(s) in the case of multiple links. Further, in some cases, the indication can be provided "in band" (i.e., where the hole happens). The receiving apparatus, therefore, can use such knowledge to optimize its memory management accordingly. For example, the receiving apparatus can reserve the appropriate number of bits or number of links to packets that will be received from the other link.

According to certain aspects, the transmitting apparatus may determine which of the dedicated messages (e.g., message to permanently ignore or message to temporarily ignore) to send to the receiving apparatus based on one or more criteria. For example, the one or more criteria may include, but are not limited to, a priority of the missing packets, an amount of time that the sequence of packets has been stored in the transmitting apparatus, a capability of each of the transmitting/receiving apparatus (e.g., whether the receiving apparatus supports PDCP reordering, etc.), etc.

In some aspects, the transmitting apparatus may determine to request the receiving apparatus to permanently ignore the missing packets at a plurality of layers of the second apparatus if at least one of: the priority of the missing packets is below a first threshold, or the amount of time is above a second threshold. In some cases, the first threshold may be based on a priority of one or more packets added to the generated sequence. For example, the one or more added packets may have a higher priority than the missing packets.

In some aspects, the transmitting apparatus may determine to request the second apparatus to temporarily ignore the missing packets (e.g., for least one layer of the second apparatus) for a period of time if the priority of the missing packets is above a threshold. For example, if the missing packets are important (e.g., a priority above a threshold), the transmitting apparatus may want the receiving apparatus to only temporarily ignore processing of the missing packets. Otherwise, if the missing packets have a priority below a threshold, the transmitting apparatus may request the receiving apparatus to permanently ignore the missing packets. Doing so allows the transmitting apparatus to significantly reduce (at the receiving apparatus) the time that may be associated with applying a "push-based window" for receiving packets.

The following uses a NR UL transmission where the transmitting apparatus (e.g., UE) pre-builds the PDCP and RLC packet (e.g., the PDCP/RLC SNs are pre-assigned to the pre-built packet) as a reference example of how the UE may determine which dedicated message to send depending on the particular scenario. For example, the UE may have pre-built the packets with SN 1-100 and stored them in a buffer. Note, however, that those of ordinary skill in the art will recognize that there may be other situations that the transmitting apparatus uses to determine which dedicated message to send.

In one example, assume that the UE receives additional prioritized data, e.g., 20 packets that have a higher priority than one or more packets of the pre-built sequence. In such a case, the UE may determine to transmit the prioritized data before the pre-built data. To do so, the UE may flush some of the pre-built data in the buffer. The amount of the data that is flushed may be based on the size of the prioritized data. For example, the UE may flush a number of packets (e.g., 30 packets) of the pre-built data that collectively have the same size as the 20 packets of the prioritized data. The UE may then assign SN 101-120 to the prioritized data and store them in the buffer, resulting in a current buffer with packets that have SNs 31-100 and 101-120 (e.g., packets SNs 1-30 are the holes).

When the UE receives the grant for the uplink transmission, the UE may transmit packets with SNs 101-120 first and a dedicated message to request the receiver to permanently ignore packets with SNs 1-30 and temporarily ignore packets with SNs 31-100. Once the receiver receives the packets with SNs 101-120, the receiver can deliver these packets to the upper layer (of the receiver) immediately to guarantee the prioritization, and move the lower edge of the "push-based window" to SN 31. As packets with SNs 31-100 are transmitted to the receiver later, the receiver could finish the re-ordering work. Note, in this example, the UE may request the receiver to perform the re-ordering at the PDCP layer (e.g., the message received from the UE may include an indication of RLC SNs and/or PDCP SNs).

In another example, assume that the UE receives additional prioritized data, e.g., 20 packets that have a higher priority than one or more packets of the pre-built sequence, and determines to transmit the prioritized data before the pre-built data. The UE may flush some of the pre-built data in the buffer, e.g., which has at least the same size of the 20 packets or has at least the same number of packets as the prioritized data (20 packets in this example), whichever is the larger of the two. For example, the UE may flush 30 packets, whose total size is equivalent to the 20 packets of the prioritized data. The UE may then assign SNs 1-20 to the prioritized data (e.g., by assigning SNs of some of the missing packets to the prioritized data as opposed to assigning new SNs to the prioritized data) and store them in the buffer. The current buffer may then have packets with SNs 1-20 and 31-100 (e.g., packet SNs 21-30 are the holes).

When the UE receives the grant for the uplink transmission, the UE may transmit packets with SNs 1-20 first. Once the receiver receives the packets 1-20, the receiver may deliver the packets to the upper layer (of the receiver) immediately to guarantee the prioritization and move the lower edge of the receiver "push-based window" to SN 21. Afterwards, as the UE transmits packets with SNs 31-100, the UE may send a dedicated message to request the receiver to permanently ignore packets with SNs 21-30 (e.g., at multiple (RLC and PDCP) layers) and advance the lower edge of the receiver "push-based window" to SN 31 at multiple layers of the receiver. The receiver may continue to perform re-ordering work for the packets with SNs 31-100.

In yet another example, assume the UE determines that some of the data (e.g., packets with SNs 1-30) stored in the buffer has been stored for a significant amount of time (e.g., above a threshold amount of time). This may trigger the discard timer (e.g., at the PDCP layer) to expire.

In such a case, the UE may determine to flush this portion of the pre-built data (e.g., packets with SNs 1-30). At the same time, the UE may build new data that has the same size as the flushed 30 packets and assign, e.g., SNs 101-120, to the new built data. The current buffer may then have packets with SNs 31-120. When the UE receives the grant for the uplink transmission, the UE may transmit packets starting from SN 31 and send a dedicated message to the receiver to request the receiver to permanently ignore packets with SNs 1-30 (at multiple layers) and advance the lower edge of the receiver window to SN 31. Once the receiver receives the packet starting from SN 31, the receiver can deliver it to the upper layers immediately without consideration of the previous data.

Figure 9:
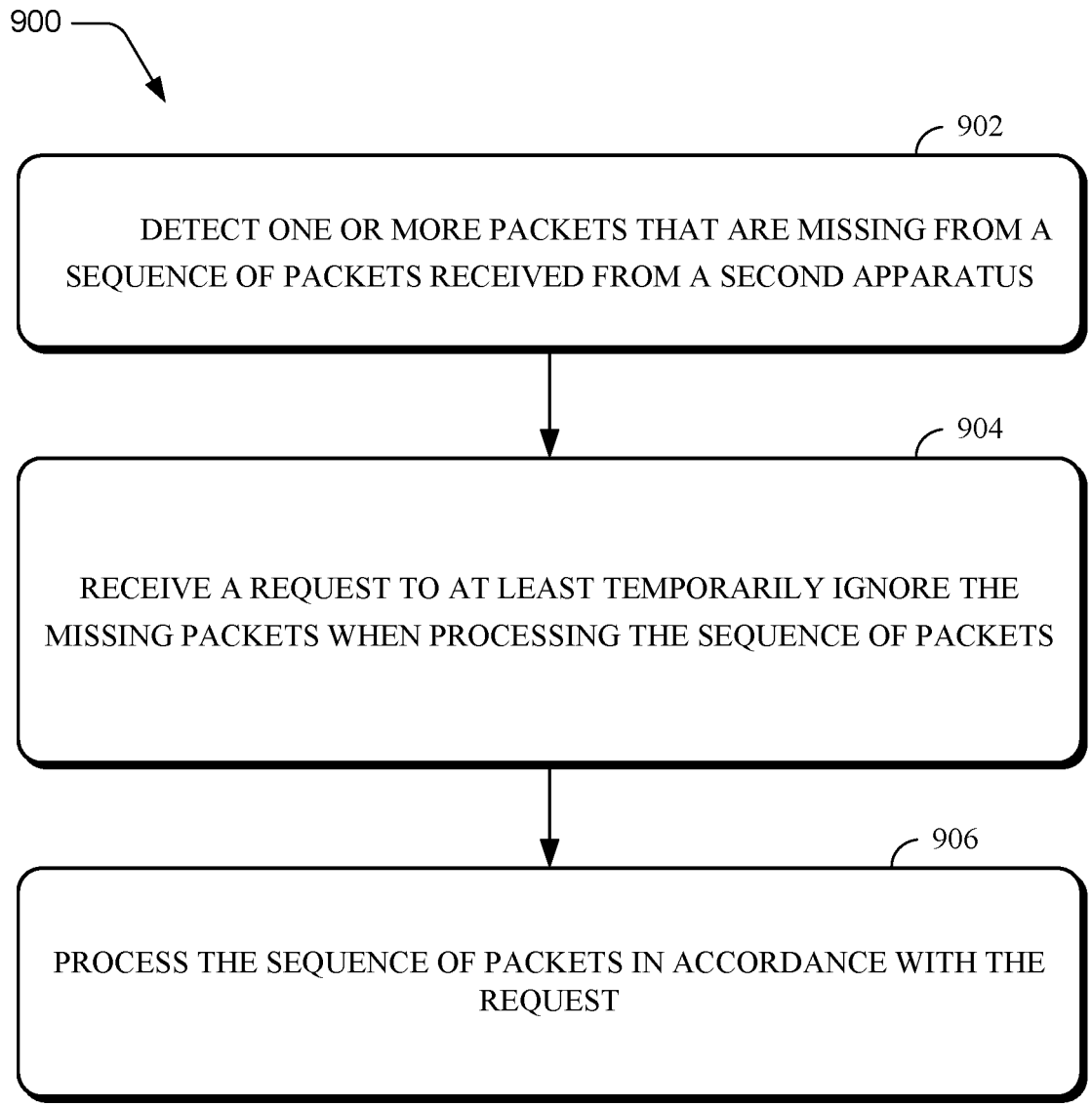
FIG. 9 illustrates example operations for wireless communications by an apparatus, in accordance with aspects of the present disclosure.

FIG. 9 illustrates example operations 900 for wireless communications, in accordance with certain aspects of the present disclosure. The operations 900 may be performed by a first apparatus (e.g., UE 120, BS 110, etc.).

The operations 900 may begin, at 902, where the first apparatus detects one or more packets that are missing from a sequence of packets received from a second apparatus (e.g., UE 120, BS 110, etc.). The first apparatus may detect the missing packet(s) based on sequence numbers of packets received in the sequence. For example, if the first apparatus receives packets with SNs 1-10 and 20-30, the first apparatus may detect those packets with SNs 11-19 are the missing packets. In another example, if the first apparatus receives packets with SNs 10-20, the first apparatus may detect those packets with SNs 1-9 are the missing packets. At 904, the first apparatus receives a request to at least temporarily ignore the missing packets when processing (e.g., performing reordering of and/or sending retransmission requests for) the sequence of packets. At 906, the first apparatus processes the sequence of packets in accordance with the request. The request may include an indication of SNs for the missing packets.

In aspects, the request may include an indication to at least temporarily ignore the missing packets during at least one of a RLC layer or PDCP layer of the first apparatus. For example, the request may include an indication of at least one of RLC SNs for the missing packets or PDCP SNs for the missing packets. In some aspects, the request may include a first request to ignore the missing packets for a period of time for at least one of the RLC layer or the PDCP layer, or a second request to permanently ignore the missing packets for both the RLC layer and PDCP layer.

In some aspects, if the request is the first request, the processing of the sequence of packets may include ignoring the missing packets for a period of time while performing PDCP reordering for one or more packets of the sequence, where the one or more packets are after the missing packets, and after performing the PDCP reordering, sending the reordered packets to a higher layer of the first apparatus. After sending the reordered packets to the higher layer, the processing may further include receiving retransmitted packets corresponding to the missing packets, performing PDCP reordering for the retransmitted packets, and sending the reordered retransmitted packets to the higher layer of the first apparatus.

In some aspects, if the request is the second request, the processing of the sequence of packets may include refraining from sending a request for retransmission of the missing packets, and permanently ignoring the missing packets while performing PDCP reordering for one or more packets of the sequence of packets, where the one or more packets are after the missing packets in the sequence. In some aspects, the processing of the sequence of packets may also be based on an indication of one or more links in which different portions of the sequence of packets were transmitted.

In one aspect, the transmitting (e.g., first) apparatus may determine to request the receiving apparatus to permanently ignore the missing packets at multiple layers of the receiving (e.g., second) apparatus when processing the sequence of packets. The multiple layers may include a RLC layer, PDCP layer, etc. In one aspect, the transmitting apparatus may determine to request the receiving apparatus to ignore the missing packets for a period of time (e.g., temporarily) for at least one layer of the receiving apparatus when processing the sequence of packets. The at least one layer may include a RLC layer and/or PDCP layer.

Figure 10:
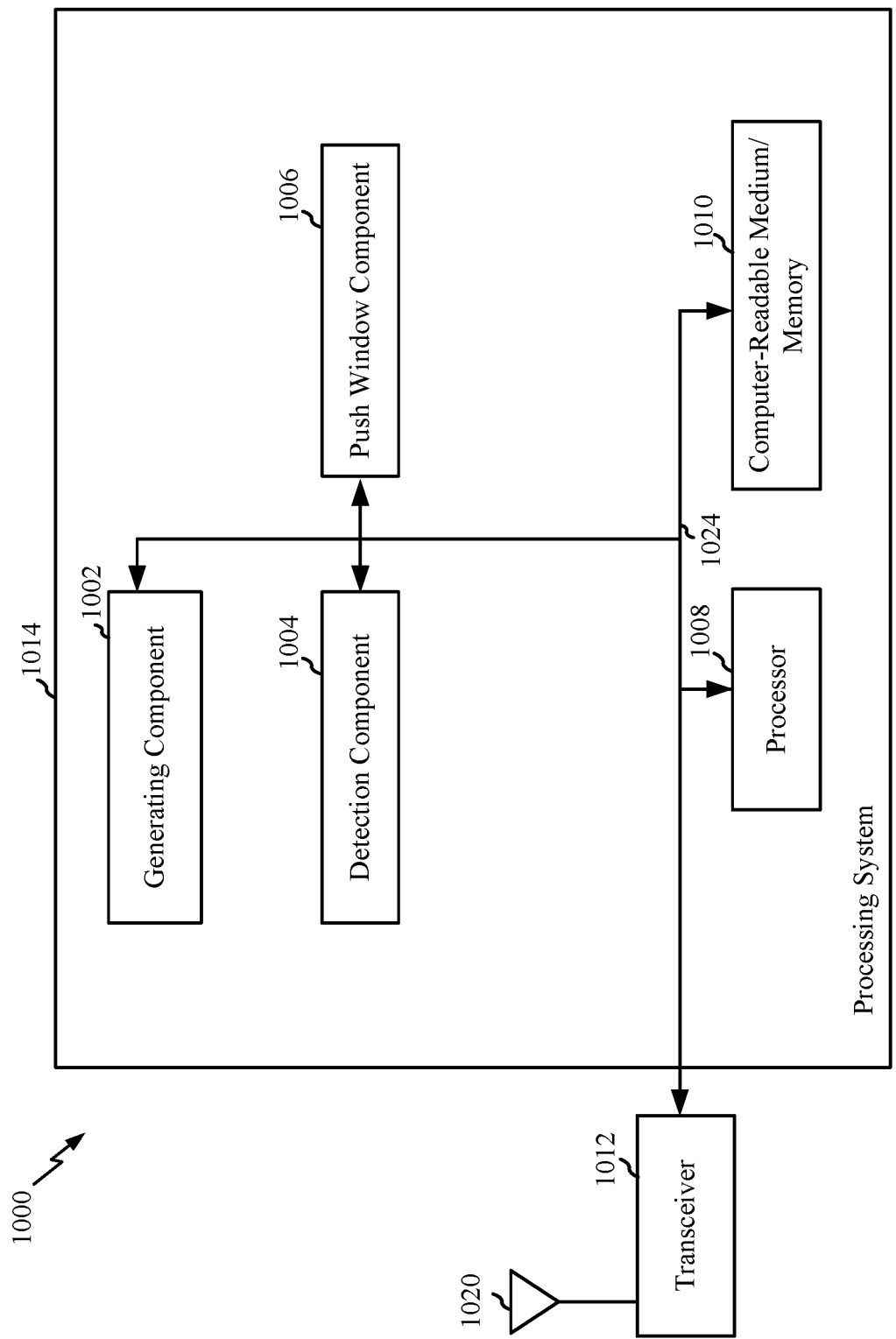
FIG. 10 illustrates a communications device that may include various components configured to perform operations for the techniques disclosed herein, in accordance with aspects of the present disclosure.

FIG. 10 illustrates a communications device 1000 that may include various components (e.g., corresponding to means-plus-function components) configured to perform operations for the techniques described herein, such as the operations illustrated in FIGS. 8-9. The communications device 1000 includes a processing system 1014 coupled to a transceiver 1012. The transceiver 1012 is configured to transmit and receive signals for the communications device 1000 via an antenna 1020, such as the various signals (e.g., messages, packets, etc.) described herein. The processing system 1014 may be configured to perform processing functions for the communications device 1000, including processing signals received and/or to be transmitted by the communications device 1000.

The processing system 1014 includes a processor 1008 coupled to a computer-readable medium/memory 1010 via a bus 1024. In certain aspects, the computer-readable medium/memory 1010 is configured to store instructions that when executed by processor 1008, cause the processor 1008 to perform the operations illustrated in FIGS. 8-9 and/or other operations for performing the various techniques discussed herein.

In certain aspects, the processing system 1014 further includes a generating component 1002 for performing the operations illustrated at 802 and 804 in FIG. 8. Additionally, the processing system 1014 includes a detecting component 1004 for performing the operations illustrated at 902 in FIG. 9, and a push window component 1006 for performing the operations illustrated at 904 and 906 in FIG. 9. In certain aspects, the generating component 1002, detecting component 1004 and push window component 1006 may be coupled to the processor 1008 via bus 1024. In certain aspects, the generating component 1002, detecting component 1004, and/or push window component 1006 may be hardware circuits. In certain aspects, the generating component 1002, detecting component 1004 and/or push window component 1006 may be software components that are executed and run on processor 1008.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting, means for signaling, means for sending, means for indicating, means for communicating and/or means for requesting may include a transmitter, which may include a transmit processor 420, TX MIMO processor 430, MOD(s) 432 and/or antenna(s) 434 of the base station 110 illustrated in FIG. 4, and/or transmit processor 464, TX MIMO processor 466, MOD(s) 454 and/or antenna(s) 452 of the user equipment 120 illustrated in FIG. 4. Means for receiving and/or means for communicating may include a receiver, which may include receiver processor 438, MIMO detector 436, DEMOD(s) 432 and/or antenna(s) 434 of the base station 110 illustrated in FIG. 4, and/or receiver processor 458, MIMO detector 456, DEMOD(s) 454 and/or antenna(s) 452 of the user equipment 120 illustrated in FIG. 4.

Means for generating, means for determining, means for processing, means for transmitting, means for signaling, means for sending, means for indicating, means for requesting, means for receiving, means for refraining, means for advancing, means for ignoring, means for adding, means for detecting, means for performing, means for reordering, means for retransmitting, means for implementing, and/or means for forwarding may include one or more processors or other elements, such as the transmit processor 420, controller/processor 440, receive processor 438 and/or antenna(s) 434 of the base station illustrated in FIG. 4, and/or the transmit processor 464, controller/processor 480, receive processor 458 and/or antenna(s) 452 of the user equipment 120 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1); a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first apparatus, comprising:
   generating a sequence of packets for transmission to a second apparatus;
   determining, based on a priority of the packets in the sequence, whether to request the second apparatus to at least temporarily ignore missing packets from the sequence;
   transmitting, to the second apparatus, a message comprising an indication to temporarily ignore the missing packets from the sequence for a period of time during at least one of a radio link control (RLC) layer of the second apparatus or a packet data convergence protocol (PDCP) layer of the second apparatus;
   transmitting, to the second apparatus, the sequence of packets without the missing packets; and
   transmitting, to the second apparatus, the missing packets from the sequence, after transmitting the sequence of packets without the missing packets.

2. The method of claim 1, wherein the determination is whether to request the second apparatus to ignore the missing packets for the period of time for at least one layer of the second apparatus.

3. The method of claim 1, wherein the determination is based on the priority of the missing packets.

4. The method of claim 3, wherein the determination comprises determining to request the second apparatus to ignore the missing packets for the period of time for at least one layer of the second apparatus if the priority of the missing packets is above a threshold.

5. The method of claim 1, wherein:
   the message is transmitted with the sequence of packets.

6. The method of claim 5, wherein the message further comprises an indication of sequence numbers for the missing packets.

7. The method of claim 1, wherein the message further comprises an indication of at least one of RLC sequence numbers for the missing packets or PDCP sequence numbers for the missing packets.

8. The method of claim 1, wherein:
the message further comprises an indication of one or more links in which different portions of the sequence were transmitted.

9. The method of claim 8, wherein:
the one or more links comprises one or more radio access technologies (RATs); and
the one or more RATs comprises at least one of 4G, 5G or WIFI.

10. A method for wireless communication by a first apparatus, comprising:
detecting one or more packets that are missing from a sequence of packets received from a second apparatus;
receiving a request to at least temporarily ignore the missing packets when processing the sequence of packets, wherein the request further comprises an indication to temporarily ignore the missing packets for a period of time during at least one of a radio link control (RLC) layer of the first apparatus or a packet data convergence protocol (PDCP) layer of the first apparatus; and
processing the sequence of packets in accordance with the request, wherein processing the sequence of packets comprises:
ignoring the missing packets for the period of time while performing PDCP reordering for one or more packets of the sequence, wherein the one or more packets are within or after the missing packets in the sequence, and
after performing the PDCP reordering, sending the reordered packets to a higher layer of the first apparatus.

11. The method of claim 10, wherein the request further comprises an indication of sequence numbers for the missing packets.

12. The method of claim 10, wherein the request further comprises an indication of at least one of RLC sequence numbers for the missing packets or PDCP sequence numbers for the missing packets.

13. The method of claim 10, further comprising:
after sending the reordered packets to the higher layer, receiving retransmitted packets corresponding to the missing packets;
performing PDCP reordering for the retransmitted packets; and
sending the reordered retransmitted packets to the higher layer of the first apparatus.

14. The method of claim 10, further comprising:
receiving an indication of one or more links in which different portions of the sequence of packets were transmitted, wherein the processing of the sequence of packets is further based on the indicated one or more links.

15. The method of claim 14, wherein:
the one or more links comprises one or more radio access technologies (RATs); and
the one or more RATs comprises at least one of 4G, 5G or WIFI.

16. A method for wireless communication by a first apparatus, comprising:
detecting one or more packets that are missing from a sequence of packets received from a second apparatus;
receiving a request to at least temporarily ignore the missing packets when processing the sequence of packets, wherein the request further comprises an indication to permanently ignore the missing packets during at least one of a radio link control (RLC) layer of the first apparatus or a packet data convergence protocol (PDCP) layer of the first apparatus; and
processing the sequence of packets in accordance with the request, wherein processing the sequence of packets comprises:
refraining from sending a request for retransmission of the missing packets; and
permanently ignoring the missing packets while performing PDCP reordering for one or more packets of the sequence of packets, wherein the one or more packets are within or after the missing packets in the sequence.

17. An apparatus for wireless communication, comprising:
means for generating a sequence of packets for transmission to a device;
means for determining, based on a priority of the packets in the sequence, whether to request the device to at least temporarily ignore missing packets from the sequence; and
means for transmitting, to the device, a message comprising an indication to temporarily ignore the missing packets from the sequence for a period of time during at least one of a radio link control (RLC) layer of the second apparatus or a packet data convergence protocol (PDCP) layer of the second apparatus;
means for transmitting, to the second apparatus, the sequence of packets without the missing packets; and
means for transmitting, to the second apparatus, the missing packets from the sequence, after transmitting the sequence of packets without the missing packets.

18. The apparatus of claim 17, wherein:
the means for determining determines whether to request the device to ignore the missing packets for the period of time for at least one layer of the device; and
the means for determining comprises means for determining, based on the priority of the missing packets.

19. The apparatus of claim 18, wherein the means for determining:
determines to request the device to ignore the missing packets for the period of time for at least one layer of the device if the priority of the missing packets is above a first threshold.

20. An apparatus for wireless communication, comprising:
means for detecting one or more packets that are missing from a sequence of packets received from a device;
means for receiving a request to at least temporarily ignore the missing packets when processing the sequence of packets, wherein the request further comprises an indication to temporarily ignore the missing packets for a period of time during at least one of a radio link control (RLC) layer of the first apparatus or a packet data convergence protocol (PDCP) layer of the first apparatus; and
means for processing the sequence of packets in accordance with the request, wherein the means for processing comprises:
means for ignoring the missing packets for the period of time while performing PDCP reordering for one or more packets of the sequence, wherein the one or more packets are within or after the missing packets in the sequence, and means for sending the reordered packets to a higher layer of the first apparatus, after performing the PDCP reordering.

21. The apparatus of claim 20, further comprising:

means for receiving retransmitted packets corresponding to the missing packets, after sending the reordered packets to the higher layer;

means for performing PDCP reordering for the retransmitted packets; and means for sending the reordered retransmitted packets to the higher layer of the first apparatus.

22. The apparatus of claim 21, wherein the request further comprises an indication of sequence numbers for the missing packets.

\* \* \* \* \*